United States Patent
Gupta et al.

(10) Patent No.: US 12,483,884 B2
(45) Date of Patent: Nov. 25, 2025

(54) METHOD AND APPARATUS FOR MANAGING SECURITY CONTEXT RELATED TO UE

(71) Applicant: Samsung Electronics Co., Ltd., Gyeonggi-do (KR)

(72) Inventors: Varini Gupta, Bangalore (IN); Rajavelsamy Rajadurai, Bangalore (IN); Lalith Kumar, Bangalore (IN); Kundan Tiwari, Bangalore (IN); Anikethan Ramakrishna Vijaya Kumar, Bangalore (IN)

(73) Assignee: Samsung Electronics Co., Ltd., Seoul (KR)

( * ) Notice: Subject to any disclaimer, the term of this patent is extended or adjusted under 35 U.S.C. 154(b) by 511 days.

(21) Appl. No.: 17/916,404

(22) PCT Filed: Apr. 2, 2021

(86) PCT No.: PCT/KR2021/004167
§ 371 (c)(1),
(2) Date: Sep. 30, 2022

(87) PCT Pub. No.: WO2021/201655
PCT Pub. Date: Oct. 7, 2021

(65) Prior Publication Data
US 2023/0122389 A1    Apr. 20, 2023

(30) Foreign Application Priority Data

Apr. 2, 2020    (IN) ............................. 202041014684
May 8, 2020    (IN) ............................. 202041019604
Apr. 1, 2021    (IN) ............................. 2020 41014684

(51) Int. Cl.
H04W 12/06    (2021.01)
H04W 8/20    (2009.01)
H04W 60/06    (2009.01)

(52) U.S. Cl.
CPC ............. *H04W 12/06* (2013.01); *H04W 8/20* (2013.01); *H04W 60/06* (2013.01)

(58) Field of Classification Search
CPC ........ H04W 8/20; H04W 12/06; H04W 60/06
(Continued)

(56) References Cited

U.S. PATENT DOCUMENTS

2019/0007500 A1    1/2019    Kim et al.
2019/0313238 A1    10/2019    Palanigounder et al.
2019/0349763 A1    11/2019    Wu et al.

OTHER PUBLICATIONS

NEC, "Synchronization of KAUSF Between AUSF and UE", S3-191206, 3GPP TSG-SA WG3 Meeting #95, May 6-10, 2019, 12 pages.
(Continued)

*Primary Examiner* — Joel Ajayi
(74) *Attorney, Agent, or Firm* — The Farrell Law Firm, P.C.

(57) ABSTRACT

Embodiments of present disclosure relates to an apparatus and method for managing security context related to a UE. Initially, registration of a UE with a new AMF in a communication network is identified. Further, generation of new security context by new AUSF selected by the new AMF for authentication of the UE is detected. Further, presence of one or more old security contexts elated to the UE and generated by one or more old AUSFs selected by one or more old AMFs for one or more previous authentications of the UE, is detected. Upon the detection, de-registration of the UE with the one or more old AUSFs is initiated for managing security context related to the UE in the communication network. Thus, stale and inactive security context
(Continued)

related to the UE may be deleted in the network and security of communication with the UE is enhanced.

8 Claims, 10 Drawing Sheets

(58) Field of Classification Search
USPC .......................................................... 455/411
See application file for complete search history.

(56) References Cited

OTHER PUBLICATIONS

Huawei, HiSilicon, "Discussion on Authentication Result Removal", S3-200195, 3GPP TSG-SA3 Meeting #98e, Mar. 2-6, 2020, 2 pages.
European Search Report dated Feb. 13, 2024 issued in counterpart application No. 21780057.2-1218, 7 pages.
PCT/ISA/210 Search Report issued on PCT/KR2021/004167, Jul. 7, 2021, pp. 3.
PCT/ISA/237 Written Opinion issued on PCT/KR2021/004167, Jul. 7, 2021, pp. 4.
3GPP TS 24.501 V17.7.1 Technical Specification 3rd Generation Partnership Project; Technical Spefication Group Core Network and Terminals; Non-Access Stratum (NAS) protocol for 5G System (5GS); Stage 3; (Release 17), Jun. 27, 2022, pp. 991.
3GPP TS 38.413 V16.10.0 Technical Specification 3rd Generation Partnership Project; Technical Specification Group Radio Access Network; NG-RAN; NG Application Protocol (NGAP) (Release 16), Jun. 23, 2022, pp. 482.
Samsung, "Maintain only latest Kausf in network", 3GPP TSG-CT4 Meeting #98-e, C4-203129, E-Meeting, May 15, 2020, pp. 7.
3GPP TS 23.502 V16.4.0 Technical Specification 3rd Generation Partnership Project; Technical Specification Group Services and System Aspects; Procedures for the 5G System (5GS); Stage 2 (Release 16), Mar. 27, 2020, pp. 584.
3GPP TS 33.501 V16.2.0, Technical Specification 3rd Generation Partnership Project; Technical Specification Group Services and System Aspects; Security architecture and procedures for 5G system (Release 16) Mar. 27, 2020, pp. 229.
3GPP TS 29.509 V16.3.0 Technical Specification 3rd Generation Partnership Project; Technical Specification Group Core Network and Terminals; 5G System; Authentication Server Services; Stage 3 (Release 16) Mar. 30, 2020, pp. 60.
3GPP TR 33.846 V0.5.0 Technical Specification 3rd Generation Partnership Project; Technical Specification Group Services and System Aspects; Study on authentication enhancements in 5G System; (Release 16) Jan. 2, 2020, pp. 27.
European Search Report dated May 7, 2024 issued in counterpart application No. 21780057.2-1218, 10 pages.

METHOD AND APPARATUS FOR MANAGING SECURITY CONTEXT RELATED TO UE

CROSS-REFERENCE TO RELATED APPLICATION(S)

This application is a U.S. National Phase Entry of PCT International Application No. PCT/KR2021/004167, which was filed on Apr. 2, 2021, and claims priority to Indian Patent Application Nos. 202041014684, 202041019604, and 202041014684, which were filed in the Indian Intellectual Property Office on Apr. 2, 2020, May 8, 2020, and Apr. 1, 2021, respectively, the entire disclosure of each of which is incorporated herein by reference.

TECHNICAL FIELD

The present subject matter is related in general to authentication of UE in a wireless communication network. The present subject matter relates to authentication and key management for connecting to 3GPP networks. Particularly, but not exclusively, to a system and method of maintaining latest security key ($K_{AUSF}$) upon simultaneous registration to 3GPP and non-3GPP networks and/or after re-authentication via new Authentication Server Function (AUSF) and/or registration via multiple Serving Networks (SNs).

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Authentication of user equipment and network functions is one of fundamental aspects of a secure and reliable wireless communication network. Without proper authentication mechanisms, rogue network functions may get access to identity of user equipment along with other information related to the user equipment. With the access, the rogue network functions may impersonate the user equipment to perform illegal activities. In 3GPP-standards based 5G networks, Unified Data Management (UDM) of home network of the user equipment is responsible for ensuring that the user equipment is authenticated in a serving-network. The authentication needs to be performed before the serving-network is allowed to access the identity and subscription information of the user equipment. Also, the authentication needs to be performed before the user equipment is allowed to access services offered by the serving network. The UDM achieves such authentication by ensuring that the identity and the subscription information of the user equipment is provided to the serving-network, only upon receiving a confirmation that the user equipment is authenticated in the serving network.

Generally, when a user equipment connects to the serving network, an Access and Mobility Function (AMF) in the serving network requests an Authentication Server Function (AUSF) to start authentication procedure. The AUSF downloads information required to authenticate the user equipment from the UDM and performs authentication procedure as defined in 3GPP TS 33.501. The AUSF may then update the UDM with identity of the serving-network along with authentication result which is called as "UE Authenticated" status. The AUSF provides permanent identity of the user equipment which is known as Subscription Permanent Identifier (SUPI) to the AMF only upon successful authentication.

Upon receiving the SUPI, the AMF in the serving network proceeds to download the subscription information of the user equipment by first registering itself in the UDM. The registration may be achieved by sending Nudm_UECM_Registration request to the UDM. Further, the AMF sends Nudm_SDM_Get request to the UDM. Upon receiving the Nudm_UECM_Registration request, the UDM validates that the AMF registering itself in the UDM belongs to the same serving-network as updated by the AUSF, and that the user equipment was recently and successfully authenticated in that network.

Typically, when the serving AMF changes due to mobility of the user equipment within a network, which may be the serving-network or the home network, the user equipment may or may not be re-authenticated upon every such change. However, upon every such AMF change, a new AMF may register itself in the UDM so that the new AMF continues to receive subscription updates of the user equipment or can route incoming calls of the user equipment to the new AMF. Subscription and state information of the user equipment are transferred from old AMF to the new AMF using procedures defined in 3GPP TS 23.501 & 3GPP TS 23.502.

However, if the UDM suspects some foul-play during Nudm_UECM_Registration procedures, depending on local policies, the UDM may ask the new AMF to re-authenticate the user equipment. For example, if a time since the user equipment was authenticated is longer than a locally configured threshold, the UDM may reject the Nudm_UECM_Registration procedure with a request to re-authenticate the user equipment with new AUSF.

DISCLOSURE OF INVENTION

Solution to Problem

Present disclosure discloses a method and system to handle security context. Particularly, when users register(ed) simultaneously to 3gpp and non-3gpp networks via different serving-networks, leading to multiple KAUSF being generated, the present invention specifies how network ensures to maintains latest keys even after user disconnects from one of the network. Similarly, when users register to an SNPN via PLMN or vice-versa, the present invention specified how UE maintains multiple keys relevant to the access it communicates with.

In an embodiment, the present disclosure relates to an apparatus for managing security context related to a UE. The apparatus comprises a processor and a memory communicatively coupled to the processor. The memory stores processor-executable instructions, which, on execution, cause the processor to identify registration of a UE with a new AMF in a wireless communication network. Further, generation of new security context by new AUSF selected by the new AMF for authentication of the UE is detected. Further, presence of one or more old security contexts related to the UE and generated by one or more old AUSFs selected by one or more old AMFs for one or more previous authentications of the UE, is detected. Upon the detection, the apparatus initiates de-registration of the UE with the one or more old AUSFs for managing security context related to the UE in the wireless communication network.

In an embodiment, the present disclosure relates to a method for for managing security context related to a UE. Initially, registration of a UE with a new AMF in a wireless communication network is identified. Further, generation of new security context by new AUSF selected by the new AMF for authentication of the UE is detected. Further, presence of one or more old security contexts related to the UE and generated by one or more old AUSFs selected by one or more old AMFs for one or more previous authentications of the UE, is detected. Upon the detection, de-registration of the UE with the one or more old AUSFs is initiated for managing security context related to the UE in the wireless communication network.

In an embodiment, when the UE is purged from the network, the UDM performs two checks before deleting AUSF instance information (deletion of the UE security context in the AUSF and/or deletion of AUSF instance information in the UDM). First, if the UE is still connected via another serving network via other access. Second, if the AUSF-instance which is a candidate for deletion holds the latest $K_{AUSF}$.

If both checks are true, the AUSF information is not deleted (nor an indication sent to the AUSF to delete the security keys).

In another embodiment, when UE connects to SNPN services via PLMN (or vice versa (UE connects to PLMN services via SNPN), the security information ($K_{AUSF}$) is maintained in ME per subscription/network/UDM, independently/separately. The subscription/UDM refers to individual PLMN and SNPN subscriptions, and the network refers to home-PLMN or SNPN IDs. The SNPN and PLMN maintain the $K_{AUSF}$ derived for the UE independently. The security information ($K_{AUSF}$) is maintained in ME per subscription/network/UDM independently/separately. Further, the information of the home network (for example, HPLMN ID, like so) is maintained along with the $K_{AUSF}$, so that the UE and/or the network can differentiate stored $K_{AUSF(s)}$ and identify it uniquely when required, based on differentiator (for example, HPLMN ID, like so).

In another embodiment, when the UE connects to different access networks, the security information/context ($K_{AUSF}$) is maintained in ME per access network independently/separately. This implies that the information of the access network (for example, 3GPP network or Non-3GPP network, like so) is maintained along with the $K_{AUSF}$, so that the UE and the network can differentiate the stored $K_{AUSF(s)}$ and identify it uniquely when required, based the differentiator (for example, 3GPP network or Non-3GPP network, like so).

In another embodiment, the UDM may request the AUSF not to remove parameters related to $K_{AUSF}$, such as, SUPI, $K_{AUSF}$, counters maintained along with the $K_{AUSF}$ and the like.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
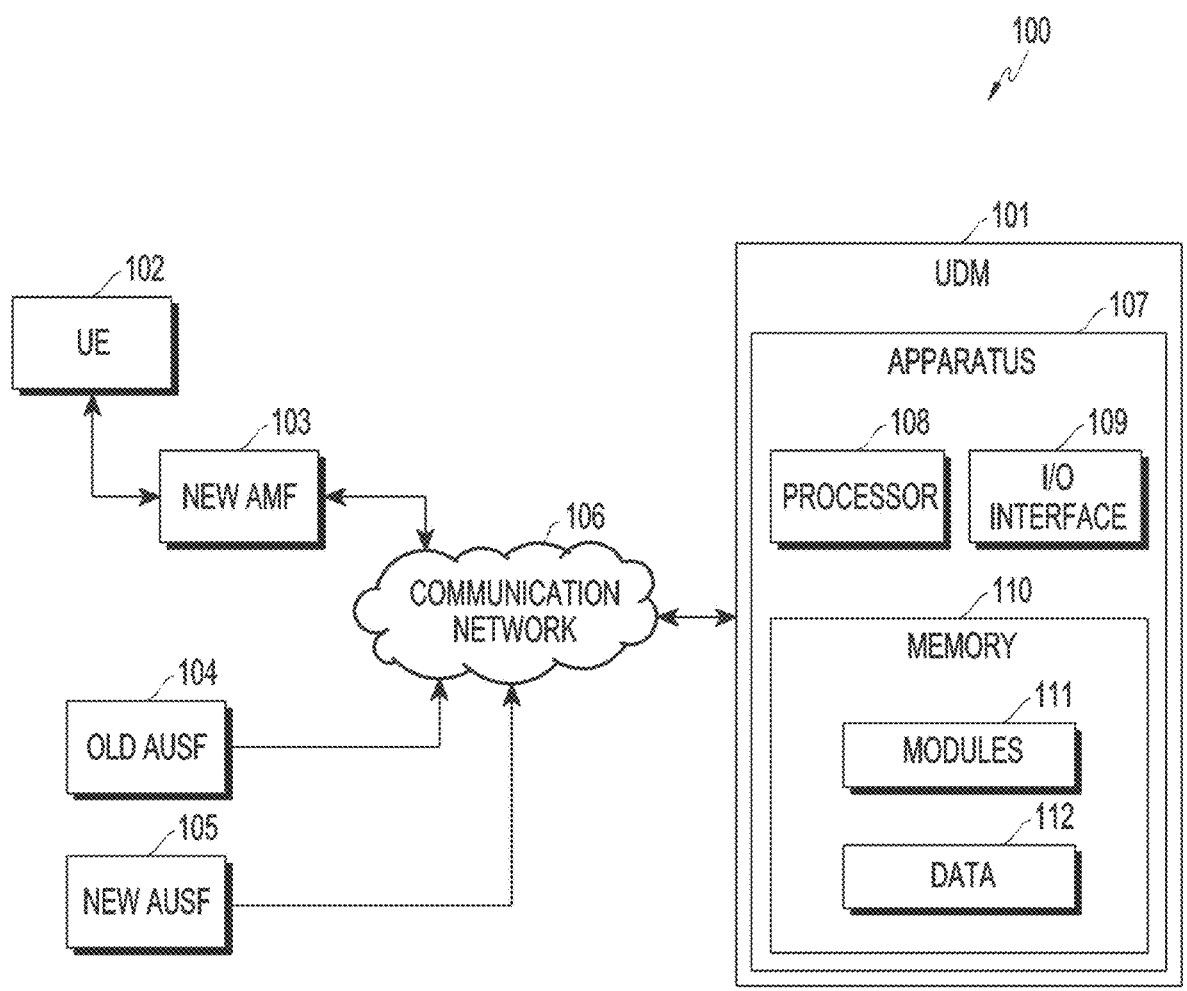
FIG. 1 illustrates an exemplary environment of an apparatus for managing security context related to UE, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

MODE FOR THE INVENTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to method and apparatus for managing security context related User Equipment (UE) in a wireless communication network. The present disclosure provisions to clear and delete stale and unused security keys related to the UE. By which, security of the UE in a network is enhanced. When the UE registers with a new AMF and re-authentication for the UE is initiated, the proposed apparatus and method initiates de-registration of the UE with one or more old AUSFs related to the UE. By the de-registration, one or more old security contexts or security keys related to the UE are cleared or deleted, to provision a secure communication for the UE in the wireless communication network.

Consider that, upon successful authentication procedure, the user equipment de-registers from the serving-network, or is no longer authenticated in the serving-network, the UDM may not be aware of such situation. 3GPP TR 33.846 defines a scenario in which a rogue AMF with access to the SUPI of the user equipment, may send a fraudulent Nudm_UECM_Registration request for registering itself as serving AMF of a subscriber in the UDM. However, the subscriber may not be actually present in the serving-network. Such a scenario not only exposes the subscription information to the rogue AMF, but also may result in the user equipment no longer receiving any incoming calls. Thus, a denial-of-service scenario may be created. In addition, the serving-network may claim to have served the user equipment for a long duration after the user equipment leaves the serving network. Thereby, the serving network may over-charge the home network.

One of the existing solutions in 3GPP TS 29.509 and 29.503 to overcome above issues is to have a "good" AMF in the serving network delete "UE Authenticated" status in the UDM. This involves AMF in the serving network send a request to the AUSF to delete the status. The AUSF in-turn may send a request to the UDM to delete the status. This is done whenever the serving AMF determines that the user can no longer be present in the serving-network. This way, a rogue AMF cannot register itself in the UDM by sending fraudulent Nudm_UECM_Registration request, as UDM will not have a corresponding "UE Authenticated" status, and hence will trigger re-authentication.

However, the existing solution suffers from many drawbacks. For instance, if the serving AMF changes due to user's mobility, and UE/AMF continues to use old security information, the new AMF may not have sufficient information to delete user's authentication status in the AUSF. Hence, the "UE Authenticated" status can also not be deleted in the UDM. Thus, the user is still exposed to the DoS attack. This happens because the AUSF's details that handled the user's authentication while in first AMF, are not transferred to the new AMF. The details include nf-instance ID of the AUSF and the location of user's data in that nf-instance.

Further, the existing solutions suffer from the rogue AMF which can hijack user session while user is still in the serving-network. In such scenario, the user may not be able to get any "Mobile-Terminated" services, until a "Mobile-Originated" call is initiated. Thus, the existing solutions rely on ability of the AMF in serving network for deleting the "UE Authenticated" status. If the "Good" AMF in the serving-network does not support these procedures, the user is still exposed to such DoS attacks. Instead, if the UDM itself can determine whether Nudm_UECM_Registration request from rogue AMF is suspicious, it can trigger re-authentication.

The information disclosed in this background of the disclosure section is only for enhancement of understanding of the general background of the invention and should not be taken as an acknowledgement or any form of suggestion that this information forms the prior art already known to a person skilled in the art.

In 3GPP-standards based 5G networks, home network (Unified Data Management (UDM)) is responsible for ensuring that a user is authenticated in a serving-network before serving-network is allowed to access user's identity and subscription information, and when the user is allowed to access services offered. When a User Equipment (UE) connects to the network, Access Management Function (AMF) in serving network discovers and selects an Authentication Server Function (AUSF) instance and requests it to start authentication procedure. The AUSF downloads information required to authenticate the user from UDM and performs an authentication procedure as defined in 3GPP TS 33.501.

Once authentication is successful, UDM stores AUSF instance ID that authenticated the UE, while the selected AUSF instance stores key ($K_{AUSF}$) generated as part of the authentication procedure. This helps UDM to send any future protected message to UE (e.g. Steering-of-Roaming Information or other UE configuration parameters). UE also generates and stores the $K_{AUSF}$ which can verify integrity of message and/or decrypt the messages sent by the home network via a serving network.

If, after initial authentication, the (home) network needs to authenticate the UE again, for e.g. due to UE registering simultaneously in another serving-network via non-3GPP access, or other factors, the AMF may select a new AUSF instance, and a new $K_{AUSF}$ may be generated in UE as well as the new-AUSF-instance as a result of the successful authentication procedure. In such a scenario, it is expected that network/UE uses only latest $K_{AUSF}$ for protecting further communication.

In case when UE disconnects from the network and AMF decides to purge the UE, the AMF sends a purge indication to UDM. This may prompt UDM to delete its association with the corresponding AUSF by deleting its information from its database. Additionally, the AMF may send an indication to the AUSF instance to delete UE's security information (which includes, $K_{AUSF}$), so that it does not unnecessarily maintain unused (no-longer-used) keys in its database.

Further, consider a scenario when UE connects in serving-network-A via 3GPP access and authenticates via AUSF-instance-A. Following this, UE connects in serving-network-B via non-3GPP access and authenticates via AUSF-Instance-B. Consider that the UE disconnects from serving-network-B and is purged (while it continues to remain connected in Serving-Network-A). At this point, only AUSF-instance-B holds valid keys, as it holds the latest $K_{AUSF}$. If due to purge in serving-network-B, the UDM deletes information about AUSF-instance-B, and sends a notification to AUSF-instance-B to clear $K_{AUSF}$, it will no longer be able to protect the information to be sent to UE.

Furthermore, consider another case where UE accesses Standalone Non-Public Networks (SNPN) via Public Land Mobile Network (PLMN), as specified in Annex D.3 of 3gpp TS 23.501. Consider that the UE connects to PLMN-A and generates $K_{AUSF}$-A. Also, suppose the UE connects to SNPN-B via PLMN-A and generates $K_{AUSF}$-B. In this scenario, $K_{AUSF}$-A cannot be used in SNPN-B, and $K_{AUSF}$-B cannot be used in PLMN-A. Hence, if UE only stores the latest $K_{AUSF}$, simultaneous operation in both the networks may be an issue. Therefore, there is a need to specify how the UE handles such scenarios.

Thus, it is desired to implement a system and method which demands a need to specify how the UE handles multiple scenarios to store the latest security key.

FIG. 1 shows exemplary environment 100 including an apparatus 107, for managing security context related to a UE 102. The exemplary environment 100 may be of a wireless communication network comprising the UE 102, a UDM 101, a new AMF 103, a new AUSF 105, an old AUSF 104 and a communication network 106. In an embodiment, the wireless communication network may be a telecommunication network with Fifth Generation (5G) technology standards. The apparatus 107 may be part of the UDM 101 as shown in the figure. In an embodiment, the apparatus 107 may be integrated within the UDM 101. In another embodiment, the apparatus 107 may be externally connected to be in communication with the UDM 101. The UE 102 may be associated with a user and may be configured to receive services from home network and one or more serving networks. The home network of the UE 102 may possess permanent IP address of the UE 102. One or more network functions of the home network may be in communication with the UE 102, when the UE 102 is connected with the one or more serving networks. In an embodiment, the one or more network functions include, but are not limited to, a UDM, a AUSF and so on. In an embodiment, the UDM 101 may be configured to be manage data for access authoriza-tion, user registration, and data network profiles. In an embodiment, the AUSF in the home network may be configured to perform authentication with the UE 102. For the authentication, the AUSF may be configured to compute security context for the UE 102. In an embodiment, the security context may include, but is not limited to, authentication data, keying materials (also referred as security keys) and so on. In an embodiment, for every authentication initiated for the UE 102, the new AUSF 105 may be selected for respective authentication. The AMF related to the UE 102 may be either part of the one or more serving networks or the home network. The AMF may be configured to receive requests from the UE 102 and handle anything to do with connection or mobility management of the UE 102. In an embodiment, consider the UE 102 is moving from one location to a new location, when receiving services from either the home network or the one or more serving networks. In such scenarios, due to mobility of the UE 102, the UE 102 may get registered with the new AMF 103 associated with the new location.

Consider in the exemplary environment 100, the UE 102 connects to the serving network. The UE 102 is located in first location of the serving network. For receiving services from the serving network in the first location, the UE 102 gets registered with an old AMF (not shown in the figure) in the serving network. For the registration, the old AMF may select a AUSF for authentication. Consider the AUSF selected by the old AMF is the old AUSF 103. For initiating the authentication, the old AMF may send request to the old AUSF 103 to start authentication procedure. The old AUSF 103 may download information required to authenticate the UE 102 from the UDM 101 and may perform authentication procedure as defined in 3GPP TS 33.501. The old AUSF 103 may then update the UDM 101 with identity of the serving-network along with authentication result which is called as "UE Authenticated" status. The old AUSF 103 provides permanent identity of the UE 102 which is known as SUPI to the AMF only upon successful authentication. Upon receiving the SUPI, the old AMF in the serving network proceeds to download the subscription information of the UE 102 by first registering itself in the UDM 101. The registration may be achieved by sending Nudm_UECM_Registration request to the UDM 101. Further, the old AMF may send Nudm_SDM_Get request to the UDM. Upon receiving the Nudm_UECM_Registration request, the UDM 101 validates that the AMF registering itself in the UDM 101 belongs to the same serving-network as updated by the AUSF, and that the UE 102 was recently and successfully authenticated in the serving network.

Typically, the UE 102 may be mobile in nature and may move from one location to another. Consider the UE 102 moved from the first location to a second location. For receiving services from the serving network at the second location, the UE 102 may get de-registered from the old AMF and registers with the new AMF 103. Such de-registration with the old AMF and registration with the new AMF may take place even within the home network, when the UE 102 is moving from one location to another location. For change of AMF from the old AMF to the new AMF 103, the new AMF 103 may register itself in the UDM 101 so that the new AMF 103 continues to receive subscription updates of the UE 102. Further, UE 102 context comprising subscription information and state information of the UE 102 may be transferred from the UE 102 to the new AMF 103 using procedures defined in 3GPP TS 23.501 and 3GPP TS 23.502. In an embodiment, when the new AMF 103 receives the UE context, the new AMF 103 may be configured to re-authenticate the UE 102, for providing services to the UE 102 in the serving network. If the UDM 101 suspects some foul-play during Nudm_UECM_Registration procedures with the new AMF 103, depending on local policies, the UDM 101 may ask the new AMF 103 to re-authenticate the UE 102. For example, if a time since the UE 102 was authenticated is longer than a locally configured threshold, the UDM 101 may reject the Nudm_UECM_Registration procedure with a request to re-authenticate the UE 102.

For the re-authentication, the new AMF 103 may select the new AUSF 105 and may send request to the new AUSF 105 to start re-authentication procedure. The new AUSF 105 may download information required to authenticate the UE 102 from the UDM 101 and may perform authentication procedure. Thus, the new AUSF 105 may also generate new security context and update the UDM 101 with identity of the serving-network along with the new authentication status. Thus, upon such one or more re-authentication, more than one security context of the UE 102 may be present in the old AUSFs and the new AUSF 105, respectively.

The claimed apparatus 107 may be configured to manage such one or more security contexts for the UE 102. In an embodiment, the one or more old security contexts generated by the one or more old AUSFs for one or more old AMFs, may be stale and unused. It is desirable to clear or delete the one or more old security contexts. The apparatus 107 may be configured to delete the one or more security contexts in such scenarios. The apparatus 107 may include one or more processors 108, Input/Output (I/O) interface 109 and a memory 110. In some embodiments, the memory 110 may be communicatively coupled to the one or more processors 108. The memory 110 stores instructions, executable by the one or more processors 108, which on execution, may cause the apparatus 107 to manage the security context. In an embodiment, the memory 110 may include one or more modules 111 and data 112. The one or more modules 111 may be configured to perform the steps of the present disclosure using the data 112, to manage the security context. In an embodiment, each of the one or more modules 111 may be a hardware unit which may be outside the memory 110 and coupled with the apparatus 107. In an embodiment, the apparatus 107 may be implemented in a variety of computing systems, such as a laptop computer, a desktop computer, a Personal Computer (PC), a notebook, a smartphone, a tablet, e-book readers, a server, a network server, cloud server and the like.

In an embodiment, the apparatus 107 may receive data for managing security context related to the UE via the I/O interface 109. The received data may include, but is not limited to, information related to registration of the UE with the new AMF, information related to generation of security context for the UE 101, information related to presence of one or more old security contexts and so on. Also, the apparatus 107 may transmit data, for managing the security context related to the UE 101, via the I/O interface 109. The transmitted data may include, but is not limited to, de-registration request provided to old AUSF and so on.

Figure 2:
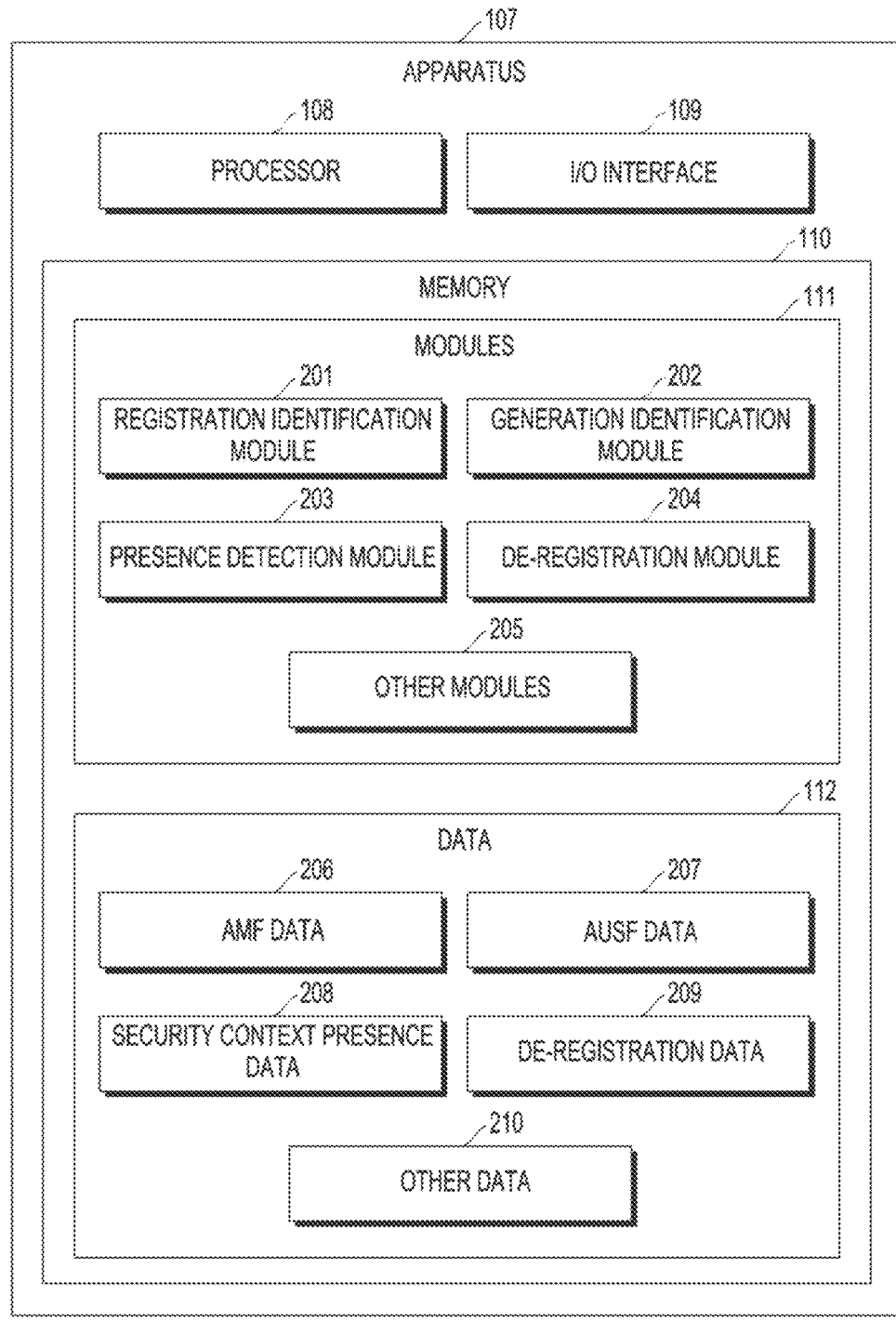
FIG. 2 illustrates a detailed block diagram of an apparatus, in accordance with some embodiments of the present disclosure.

FIG. 2 shows a detailed block diagram of the apparatus 107, in accordance with some embodiments of the present disclosure.

The data 112 and the one or more modules 111 in the memory 110 of the apparatus 107 is described herein in detail.

In one implementation, the one or more modules 111 may include, but are not limited to, a registration identification module 201, a generation identification module 202, a presence detection module 203, a de-registration module 204 and one or more other modules 205, associated with the apparatus 107.

In an embodiment, the data 112 in the memory 110 may include AMF data 206, AUSF data 207, security context presence data 208, de-registration data 209, and other data 210 associated with the apparatus 107.

In an embodiment, the data 112 in the memory 110 may be processed by the one or more modules 111 of the apparatus 107. In an embodiment, the one or more modules 111 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The one or more modules 111 of the present disclosure function to manage the security contexts related to the UE 102.

Figure 3A:
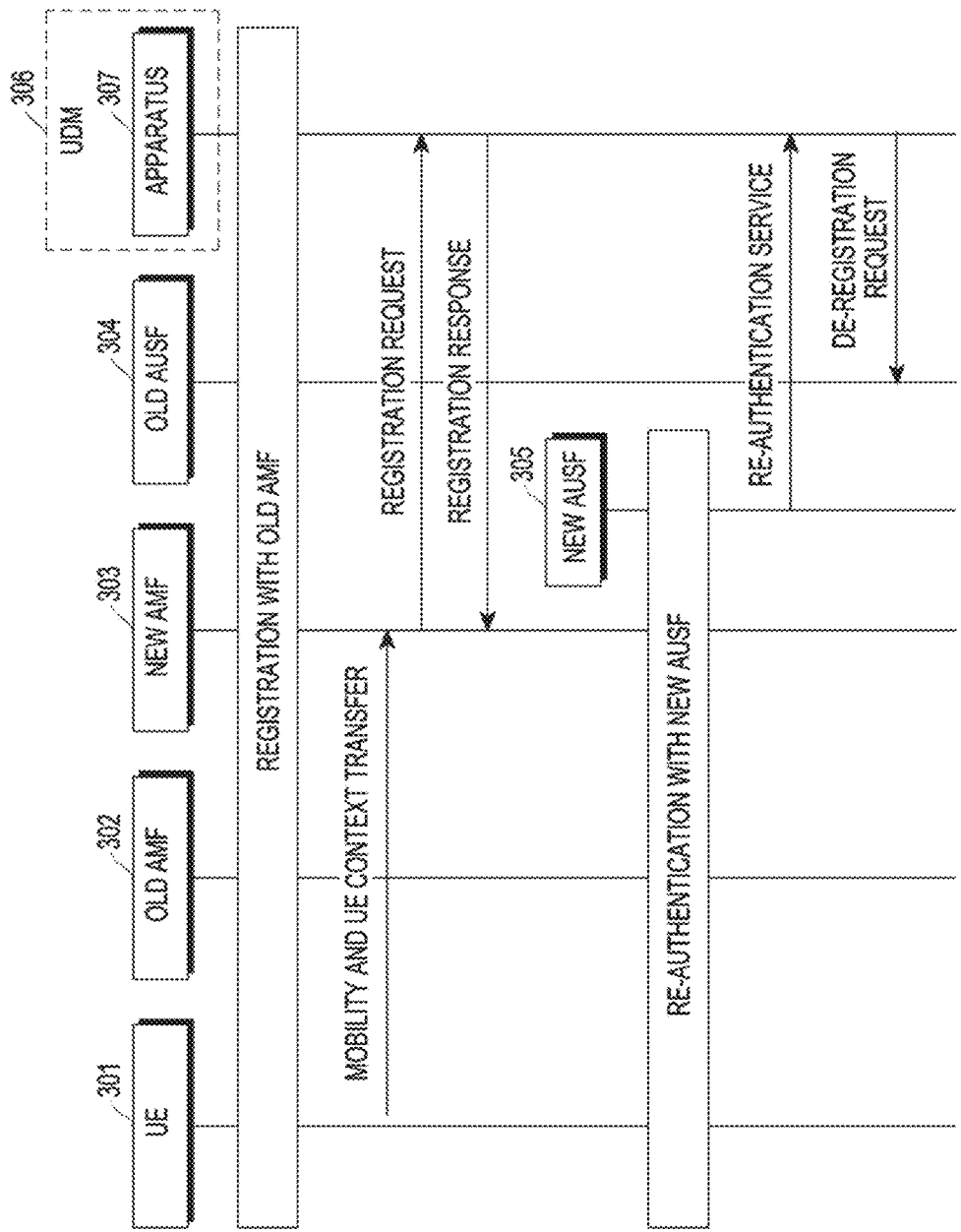
FIGS. 3a, 3b, and 3c illustrate schematic diagrams for managing security context related to UE, in accordance with some embodiments of present disclosure.

FIG. 3a illustrates schematic diagram for managing security context related to a UE 301, in accordance with some embodiments of present disclosure. Consider the UE 301 is connected to the serving network at a first location. The UE 301 may obtain services from the serving network when in the first location using a UDM 306 and an old AUSF 304 of the home network, and an old AMF of the serving network. The apparatus 307 for managing security context related to the UE 301 may be part of the UDM 306. The services may be obtained upon completion of registration with the old AMF. When the UE 301 is mobile and moves from the first location to a second location, the UE 301 may get registered with the new AMF 303. Based on the mobility, i.e., the second location of the UE 301, the new AMF 303 may be assigned to the UE 301 to obtain services from the serving network. Registration of the UE 301 with the new AMF 303 may be achieved by sharing or transferring the UE context of the UE 301 from the UE 301 to the new AMF 303. Upon receipt of the UE context, the new AMF 303 may send a registration request to the UDM 306. In reply to the registration request, the UDM 306 may send a registration response. Information related the new AMF and the old AMF may be stored as the AMF data 206 in the memory 110.

The registration identification module 201 of the apparatus 307 may be configured to identify registration of the UE 301 with the new AMF 303. The apparatus 307 may identify the registration based on the registration request and the registration response communicated between the new AMF 303 and the UDM 306.

Upon the registration of the UE 301 with the new AMF 303, when the UE context is shared with the new AMF 303, the new AMF 303 may initiate re-authentication of the UE 301. For the re-authentication, the new AMF 303 may select the new AUSF 305 from the home network of the UE 301. During the re-authentication, a new security context may be generated by the new AUSF 305. Upon the re-authentication, information related to re-authentication service may be shared with the UDM 306. In an embodiment, such information may include the authentication status details related to the re-authentication.

The generation identification module 202 of the apparatus 307 may be configured to identify the generation of the new security context by the new AUSF 305. In an embodiment, the generation may be identified when the information on the re-authentication is received upon the identification of the registration.

Further, the presence detection module 203 may be configured to detect presence of one or more old security contexts related to the UE 301. Such one or more old security contexts may have been generated by one or more old AUSFs selected by one or more old AMFs for one or more previous authentications of the UE 301. Information related the one or more old AUSFs and the new AUSF 305 may be stored as the AUSF data 206 in the memory 110. In the given example illustrated in FIG. 3a, the UE 301 is previously authenticated using the first AUSF. Hence, presence of old security context generated by the first AUSF may be detected by the apparatus 307. Information related to presence of the one or more old security contexts may be stored as the security context presence data 208 in the memory 110.

Upon detecting the presence of one or more old security contexts in the network, the de-registration module 204 of the apparatus 307 may be configured to initiate de-registration of the UE 301 with the one or more old AUSFs for managing security context related to the UE 301 in the wireless communication network. For the given example, the de-registration module 204 may initiate de-registration with the old AUSF 304. In an embodiment, for initiating the de-registration, the de-registration module 204 may be configured to send a de-registration request to the one or more old AUSFs. In an embodiment, by sending the de-registration request, the one or more old security contexts of the UE 301 may be deleted and cleared in the wireless communication network. For the given example, the de-registration module 204 may send the de-registration request to the old AUSF 304. Hence, the old security context which was generated by the old AUSF 304 is deleted from the AUSF. In an embodiment, for the deletion, the UDM 306 may provide a new service operation "Subscribe" under Nudm_UEAuthentication service. Upon providing the new service, the UDM 306 may send the de-registration request to the old AUSF 304 to delete the old security context using "Subscribe/Notify" mechanism as defined in 3GPP TS 23.501. In an embodiment, a new service may be defined in the old AUSF 304 to receive the de-registration request. In an embodiment, payload of the body of the de-registration request may contain SUPI of the UE 301. In an embodiment, the new service may be called Nausf_UECleanup, which supports a "POST" or "PUT" operation to delete the old security context from database of the old AUSF 304. In an embodiment, the de-registration request along with content of the de-registration request may be stored as the de-registration data 209 in the memory 110.

Figure 3B:
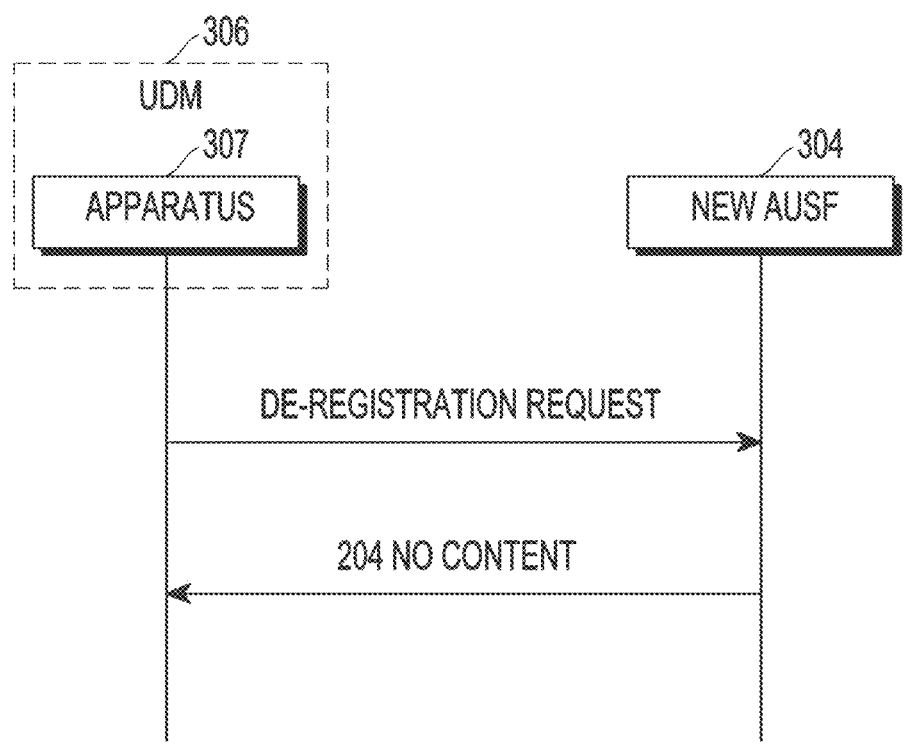

In an embodiment, upon successful deletion of the old security context, the old AUSF 304 may be configured to send a response including "204 NO CONTENT" as shown in FIG. 3b. By such deletion, access to any stale security context to any rogue network functions may be prevented. Thus, security of the UE 301 in the serving network is enhanced.

Figure 3C:
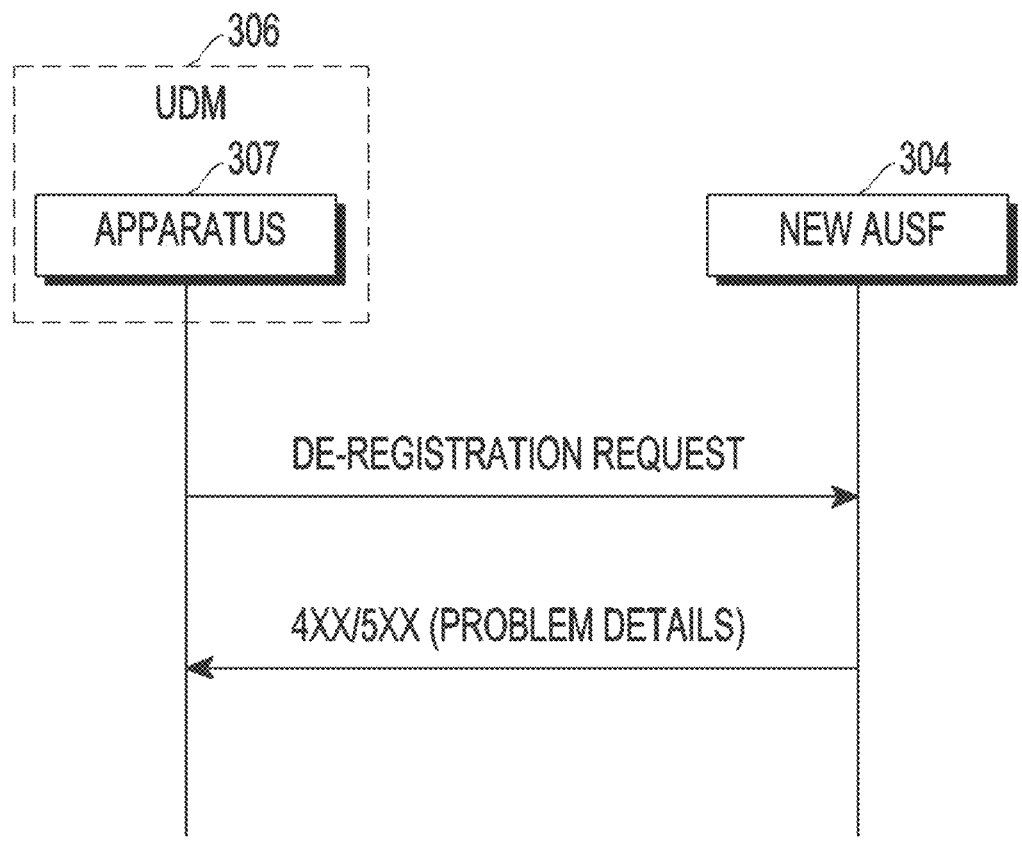

In an embodiment, when the deletion of the old security context is unsuccessful, the old AUSF 304 may be configured to send a response including HTTP status code with message body comprising details of the problem, as shown in FIG. 3c. In an embodiment, the details of the problem may be cause attribute which is set to one of application error associated with the wireless communication network. Thus, using the cause attribute, the UDM 306 may try to rectify the application error until the deletion is successful.

The other data 210 may store data, including temporary data and temporary files, generated by modules for performing the various functions of the apparatus 107. The one or more modules 111 may also include other modules 205 to perform various miscellaneous functionalities of the apparatus 107. It will be appreciated that such modules may be represented as a single module or a combination of different modules.

Figure 4:
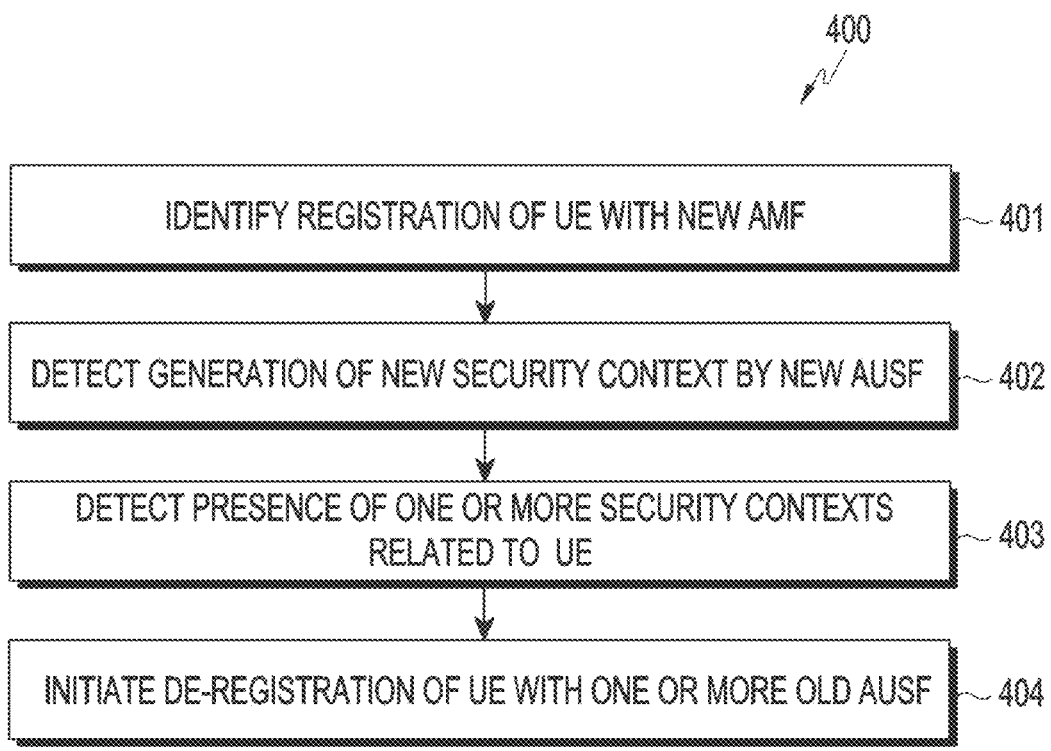
FIG. 4 illustrates a flow diagram illustrating method of an apparatus for managing security context related to UE, in accordance with some embodiments of present disclosure.

FIG. 4 shows a flow diagram illustrating method of the apparatus 107 for managing security context related to the UE 102, in accordance with some embodiments of present disclosure.

At block 401, the apparatus 107 may be configured to identify registration of the UE 102 with the new AMF 103 in the wireless communication network.

At block 402, the apparatus 107 may be configured to detect generation of the new security context by the new AUSF 305 selected by the new AMF 103 for authentication of the UE 102.

At block 403, the apparatus 107 may be configured to detect presence of the one or more old security contexts related to the UE 102. The one or more old security contexts are generated by the one or more old AUSFs selected by the one or more old AMFs for the one or more previous authentications of the UE 102.

At block 404, the apparatus 107 may be configured to initiate the de-registration of the UE 102 with the one or more old AUSFs for managing security context related to the UE 102 in the wireless communication network. In an embodiment, for initiating the de-registration, the apparatus 107 may be configured to send the de-registration request to the one or more old AUSFs to delete the one or more old security contexts of the UE 102.

As illustrated in FIG. 4, the method 400 may include one or more blocks for executing processes in the apparatus 107. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

An embodiment of the present disclosure discloses to clear and delete stale and unused security contexts which may be created due to multiple re-authentications based on mobility of the UE. By deleting the unused security context, risk of rogue NFs impersonating the UE may be prevented to provision secure network to the UE.

Figure 5:
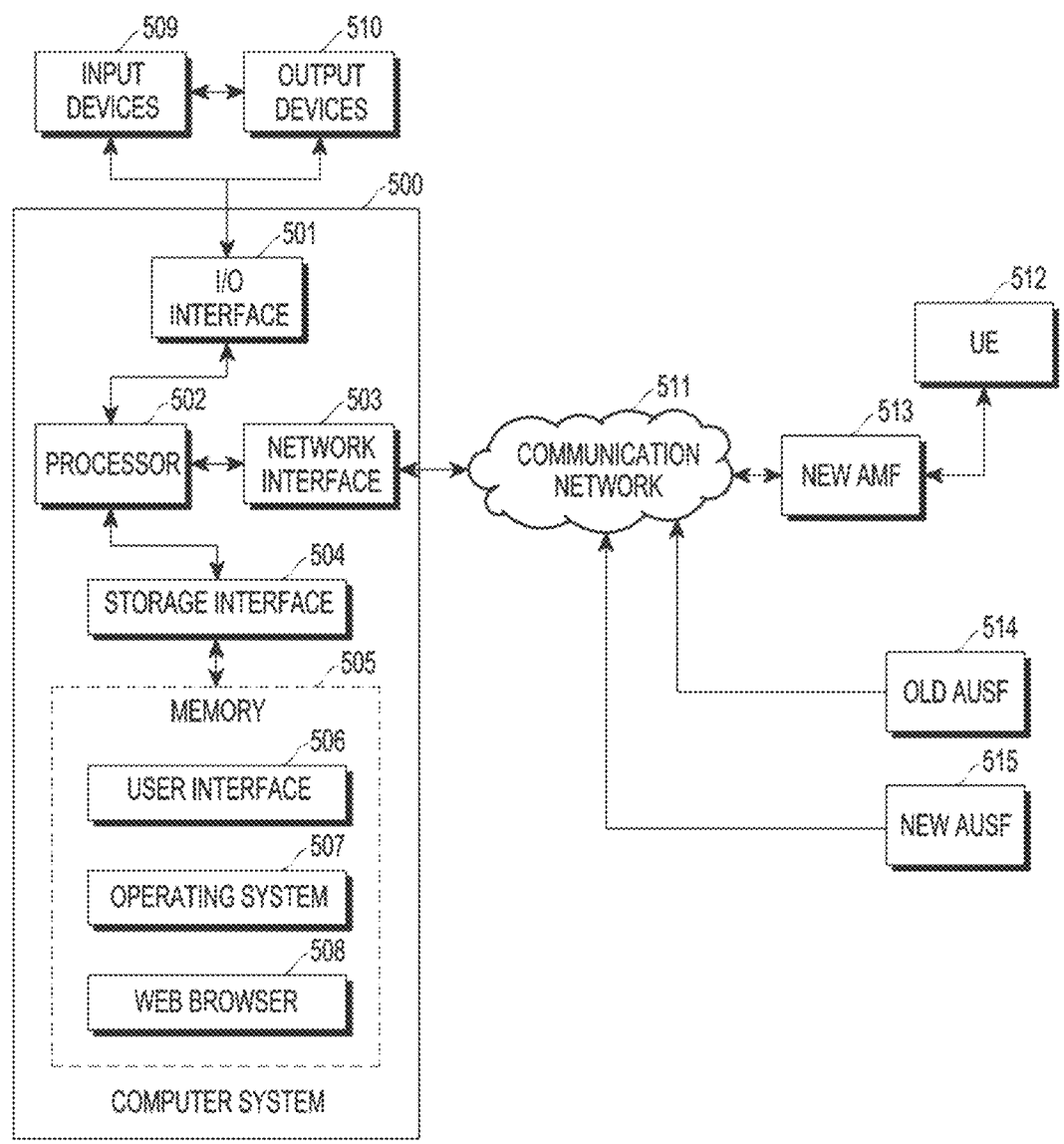
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the apparatus 107 for managing security context related to UE 512. The computer system 500 may include a central processing unit ("CPU" or "processor") 502. The processor 502 may include at least one data processor for executing processes in a wireless communication network. The processor 502 may include specialized processing units such as, integrated system (bus)

controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

In some embodiments, the computer system 500 may consist of the apparatus 107. The processor 502 may be disposed in communication with a communication network (not shown in figure) via a network interface 503. The network interface 503 may communicate with the communication network. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface 503 and the communication network, the computer system 500 may communicate with the new AMF 513, an old AUSF 514 and new AUSF 515, for managing security context related to the UE 512. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWSυ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc (CD) ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

In an embodiment, when the UE is purged from the network, the UDM performs two checks before deleting AUSF instance information (deletion of the UE security context in the AUSF and/or deletion of AUSF instance information in the UDM). First, if the UE is still connected via another serving network via other access. Second, if the AUSF-instance which is a candidate for deletion holds the latest $K_{AUSF}$.

If both checks are true, the AUSF information is not deleted (nor an indication sent to the AUSF to delete the security keys).

In another embodiment, when UE connects to SNPN services via PLMN (or vice versa (UE connects to PLMN services via SNPN), the security information ($K_{AUSF}$) is maintained in ME per subscription/network/UDM, independently/separately. The subscription/UDM refers to individual PLMN and SNPN subscriptions, and the network refers to home-PLMN or SNPN IDs. The SNPN and PLMN maintain the $K_{AUSF}$ derived for the UE independently. The security information ($K_{AUSF}$) is maintained in ME per subscription/network/UDM independently/separately. Further, the information of the home network (for example, HPLMN ID, like so) is maintained along with the $K_{AUSF}$, so that the UE and/or the network can differentiate stored $K_{AUSF(s)}$ and identify it uniquely when required, based on differentiator (for example, HPLMN ID, like so).

In another embodiment, when the UE connects to different access networks, the security information/context ($K_{AUSF}$) is maintained in ME per access network independently/separately. This implies that the information of the access network (for example, 3GPP network or Non-3GPP network, like so) is maintained along with the $K_{AUSF}$, so that the UE and the network can differentiate the stored $K_{AUSF(s)}$ and identify it uniquely when required, based the differentiator (for example, 3GPP network or Non-3GPP network, like so).

In another embodiment, the UDM may request the AUSF not to remove parameters related to $K_{AUSF}$, such as, SUPI, $K_{AUSF}$, counters maintained along with the $K_{AUSF}$ and the like.

In another embodiment, the method for managing security context related to a user equipment (UE) by unified data management (UDM) of a home network (HN), the method comprises transmitting a deregistration notification to an authentication server function (AUSF), keeping a key for the UE related to the AUSF if the UE is registered via another access and deleting the key for the UE related to the AUSF if the UE is not registered via another access, wherein the $K_{AUSF}$ is a key for the UE related to the AUSF.

Figure 6:
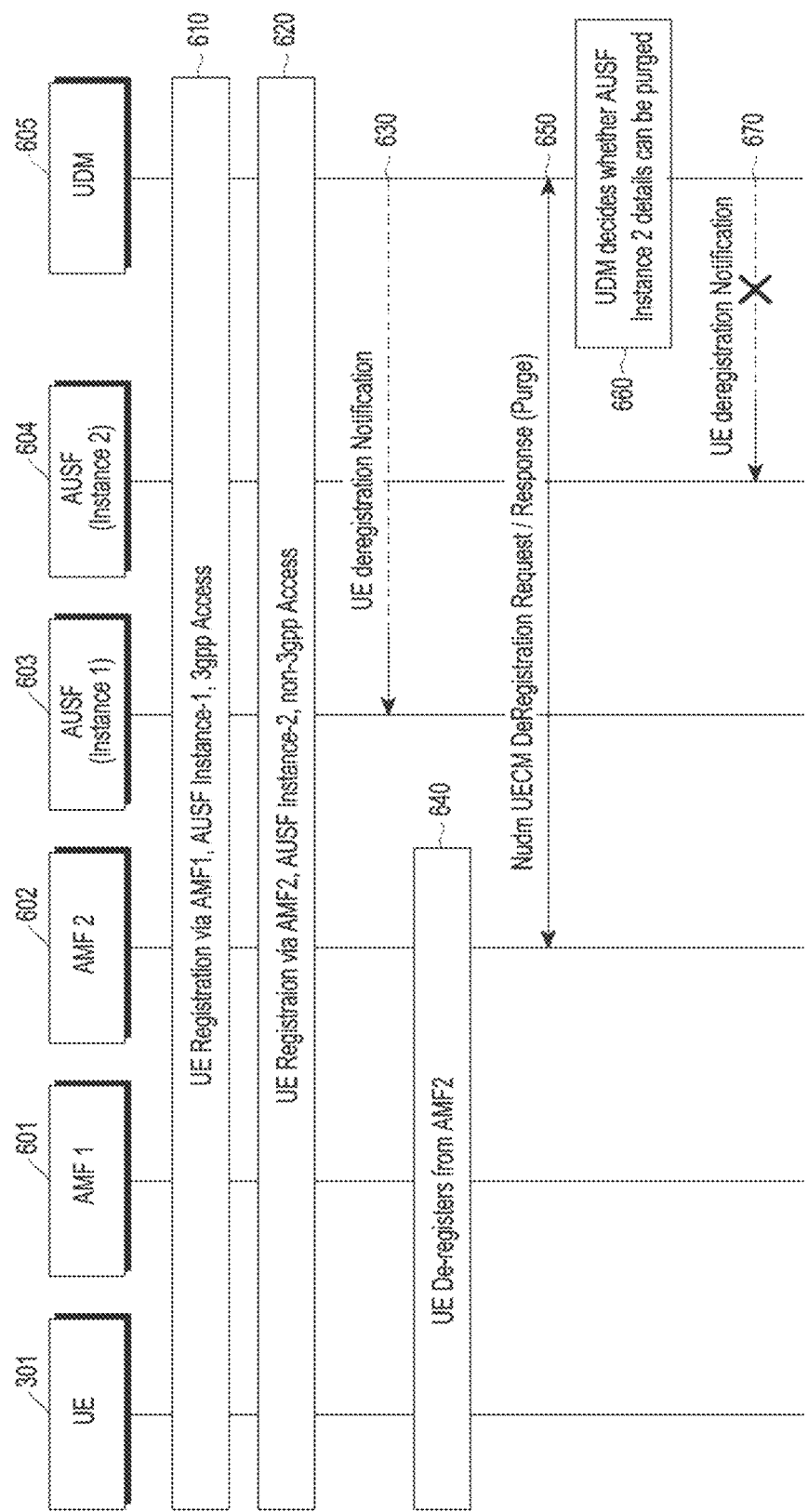
FIG. 6 illustrates an block diagram of an exemplary block diagram for maintaining latest security information ($K_{AUSF}$)

FIG. 6 illustrates an exemplary sequence flowchart for maintaining latest security information ($K_{AUSF}$), in accordance with some embodiment of the present disclosure. As shown, the UE registers in serving-network-1 via AMF1, 3GPP access and is authenticated via AUSF-instance-1. The AUSF-instance-1 stores $K_{AUSF}$ for future use. The UDM stores information that AUSF-instance-1 holds the latest $K_{AUSF}$. Further, the UE registers in serving-Network-2 via AMF2, non-3GPP access and is authenticated via AUSF-instance-2. The AUSF-instance-2 may store the $K_{AUSF}$ for future use. Thereafter, the UDM stores information that AUSF-instance-2 now holds the latest $K_{AUSF}$. Further, the UDM may send a de-registration notification to AUSF-instance-1 to clear security context (e.g. $K_{AUSF}$). At some point in time, the UE disconnects from serving-network-2. Based on configuration, the AMF initiates Nudm_UECM_Deregistration procedure towards UDM to indicate that the UE is purged in serving-network-2.

At this point in time, the UDM determines whether to send a de-registration notification to AUSF-instance-1 to clear security context (e.g. $K_{AUSF}$) and the AUSF-instance-2 details can be removed locally from database (considering UE is still connected via Serving-Network-1). In other words, the UDM checks whether the UE is in the registered state with any serving network, for example, by checking whether any other AMF is registered for the UE in its context. If registered, in such case the UDM checks whether the AUSF holds the latest key $K_{AUSF}$, for example, by checking the AUSF instance details registered for the UE in its context. Further, if the AUSF holds the latest $K_{AUSF}$, the UDM holds deletion of the UE context in the AUSF. In case if the above two situations are not satisfied, the UDM deletes the UE context in the AUSF. For instance, if there is no entry that a particular AMF is serving the UE, in such case the UDM deletes the UE context in the AUSF. In another example, if there is no entry that a particular AUSF is last served and holds the $K_{AUSF}$, the UDM may delete the UE context in the AUSF. In addition, the UDM may also decide to not send a deregistration notification to AUSF-instance-2.

In other words (in brief), the HN shall keep the latest $K_{AUSF}$ generated during successful authentication over a given access even if the UE is deregistered from that access but the UE is registered via another access. In this case, the first check is, the HN shall keep the latest $K_{AUSF}$ and second check is, whether the UE is registered via another access. If both checks are true, the AUSF information is not deleted (nor an indication sent to the AUSF to delete the security keys). If any one of the two check is false, that is, if the $K_{AUSF}$ is not the latest or UE is not register with any other access technology, then the security context in the AUSF is deleted. In detail, the Network Function (NF) Service Consumer (e.g. UDM) uses the Deregister service operation (for Deletion of security context in the AUSF for a UE) to request the AUSF to clear the security context of the UE, when the UE is no longer registered via any access-type or serving-network. It is responsibility of NF Service Consumers to ensure that security context being deleted does not hold the latest $K_{AUSF}$, if the UE is also connected via another Serving-Network.

Figure 7:
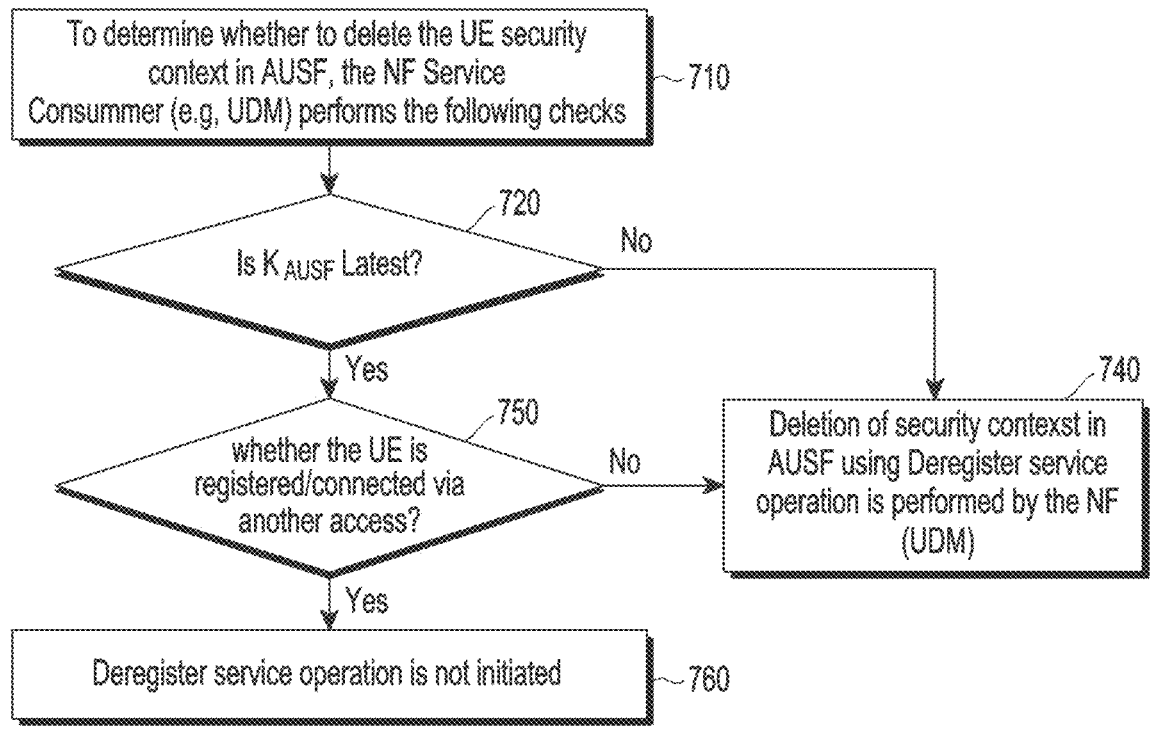
FIG. 7 illustrates an exemplary sequence flowchart for maintaining latest security context ($K_{AUSF}$)

FIG. 7 illustrates an exemplary sequence flowchart for maintaining latest security context ($K_{AUSF}$), in accordance with some embodiment of the present disclosure, where the check on whether the $K_{AUSF}$ is latest or not is performed first, then check on whether UE is also registered/connected via another Serving-Network is performed next. If both checks are true, that is the $K_{AUSF}$ is latest and UE is register with any other access technology, then the security context in the AUSF is not deleted (nor an indication sent to the AUSF to delete the security keys).

Figure 8:
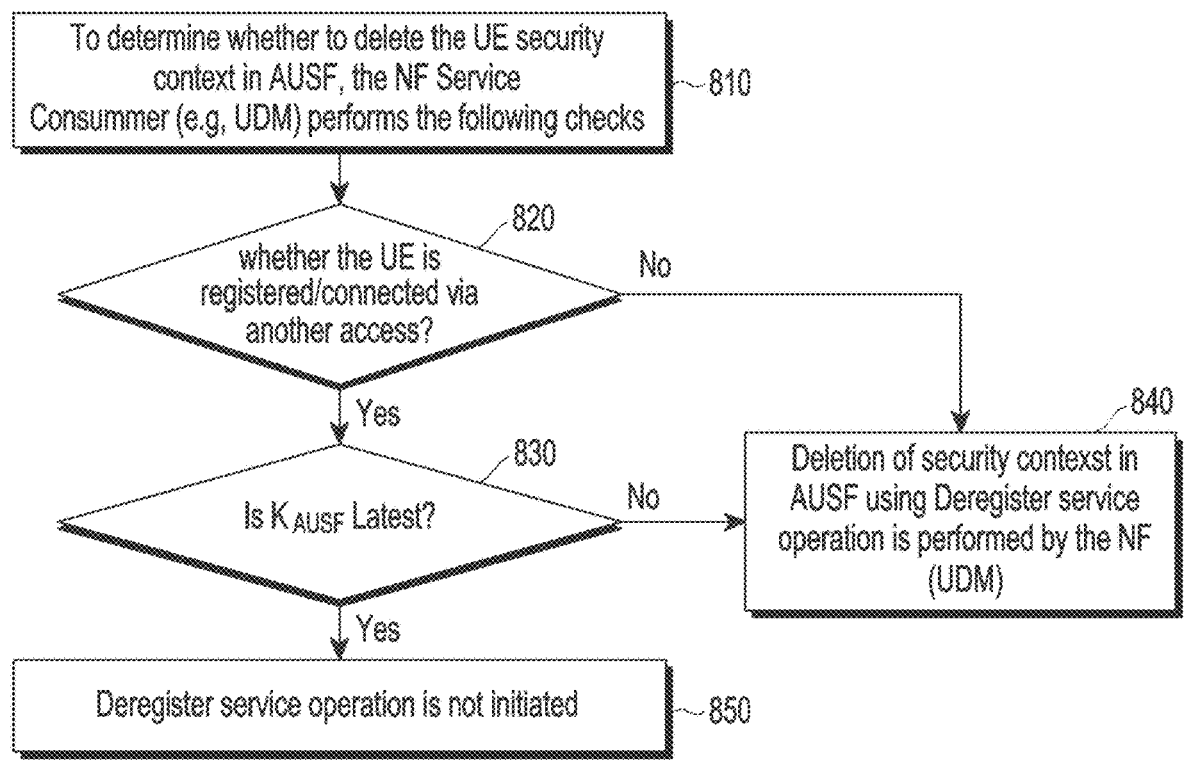
FIG. 8 illustrates an exemplary sequence flowchart for maintaining latest security context ($K_{AUSF}$).

FIG. 8 illustrates an exemplary sequence flowchart for maintaining latest security context ($K_{AUSF}$), in accordance with some embodiment of the present disclosure, where check on whether UE is registered/connected via another Serving-Network is performed first, then the check on whether the $K_{AUSF}$ is latest or not is performed next. If both checks are true, that is the $K_{AUSF}$ is latest and UE is register with any other access technology, then the security context in the AUSF is not deleted (nor an indication sent to the AUSF to delete the security keys).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The illustrated operations of FIG. 4 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The invention claimed is:

1. A unified data management (UDM) entity for managing security context related to a user equipment (UE), the UDM entity comprises:
   a processor; and
   a memory communicatively coupled to the processor, wherein the memory stores processor-executable instructions, which, on execution, cause the processor to:
      identify that the UE is authenticated via a first authentication server function (AUSF); and
      identify that the UE was previously authenticated via a second AUSF different from the first AUSF;
      generate, a deregistration request of the UE to delete a security context related to the UE in the second AUSF; and
      transmit, to the second AUSF, the deregistration request of the UE,
   wherein the deregistration request includes a subscription permanent identifier (SUPI) of the UE and the security context including a security key.

2. The UDM entity as claimed in claim 1, wherein the UE registers with a first AMF associated with the first AUSF based on mobility of the UE.

3. The UDM entity as claimed in claim 2, wherein the first AMF selects the first AUSF for authentication of the UE, when the UE transfers UE context to the first AMF from a second AMF associated with the second AUSF, upon registration of the UE with the first AMF.

4. The UDM entity as claimed in claim 1, wherein the UDM is associated with home network of the UE.

5. A method of a unified data management (UDM) entity for managing security context related to a user equipment (UE), the method comprising:
   identifying that the UE is authenticated via a first authentication server function (AUSF);
   identifying that the UE was previously authenticated via a second AUSF different from the first AUSF;
   generating, a deregistration request of the UE to delete a security context related to the UE in the second AUSF; and transmitting, to the second AUSF, the deregistration request of the UE, wherein the deregistration request includes a subscription permanent identifier (SUPI) of the UE and the security context including a security key.

6. The method as claimed in claim 5, wherein the UE registers with a first AMF associated with the first AUSF based on mobility of the UE.

7. The method as claimed in claim 6, wherein the first AMF selects the first AUSF for authentication of the UE, when the UE transfers UE context to the first AMF from a second AMF associated with the second AUSF, upon registration of the UE with the first AMF.

8. The method as claimed in claim 5, wherein the UDM entity is associated with home network of the UE.

* * * * *